No. 678,289. Patented July 9, 1901.
C. P. STEINMETZ.
COMPOUNDING ALTERNATOR.
(Application filed Jan. 10, 1898.)
(No Model.)
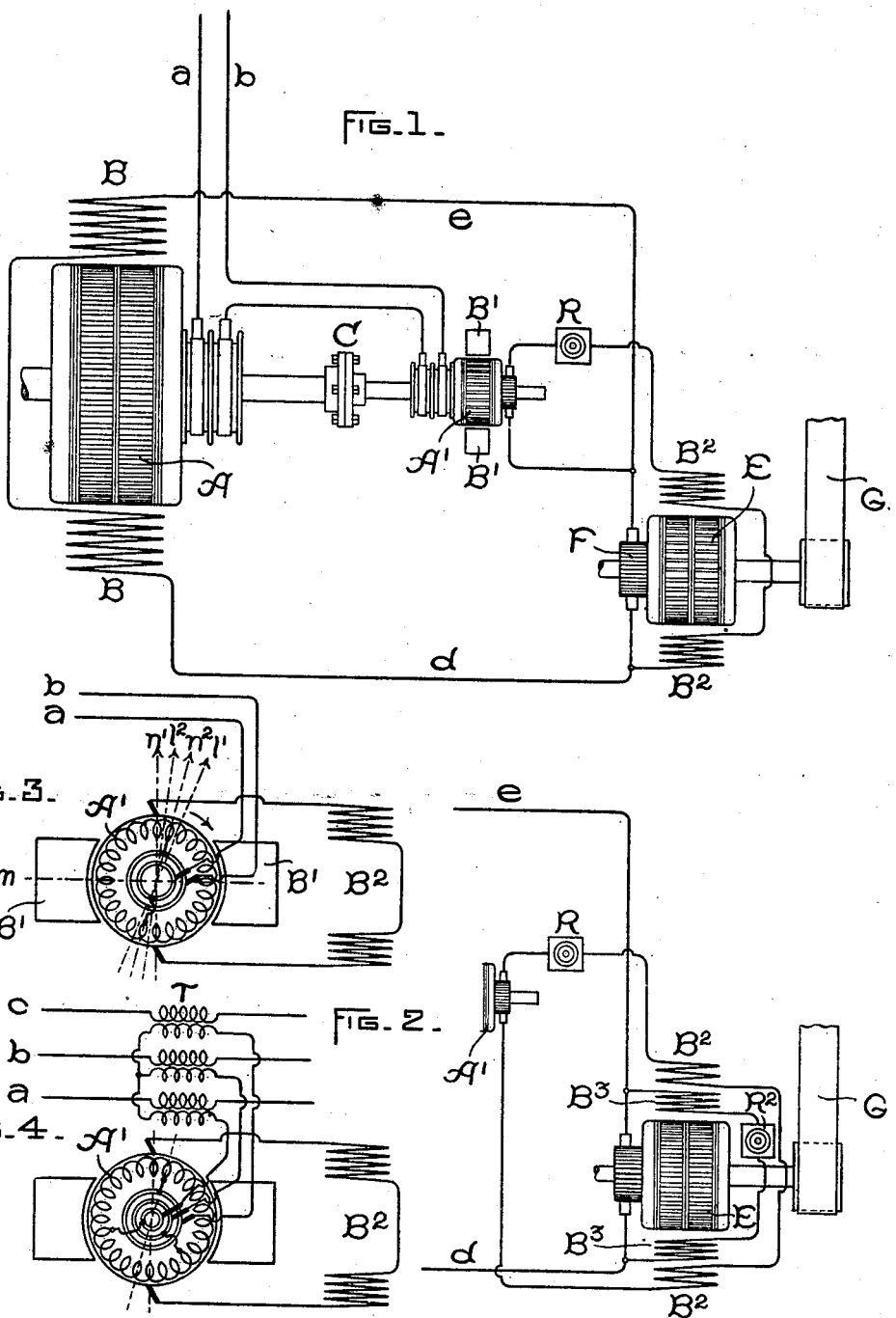

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

COMPOUNDING ALTERNATOR.

SPECIFICATION forming part of Letters Patent No. 678,289, dated July 9, 1901.

Application filed January 10, 1898. Serial No. 666,229. (No model.)

*To all whom it may concern:*

Be it known that I, CHARLES P. STEINMETZ, a citizen of the United States, residing at Schenectady, county of Schenectady, State of New York, have invented certain new and useful Improvements in Compounding Alternators, (Docket No. 590,) of which the following is a specification.

My invention aims to provide a suitable method and means of regulating the electromotive force of alternating-current dynamo-electric machines, so as to compound the machines, as for constant potential, either at the brushes or at any desired point in the distribution system irrespective of any changes in load or in the phase relation between current and electromotive force. A method and apparatus accomplishing these results was disclosed in patent to E. W. Rice, Jr., No. 595,412, dated December 14, 1897.

My present invention consists in certain improvements upon the method and apparatus disclosed in the said patent, designed particularly to avoid the large exciter of somewhat unusual design which is required by the said invention.

In the drawings attached to this specification, Figure 1 is a diagrammatic view of one embodiment of my present invention. Fig. 2 is a similar view of a slightly-modified form. Fig. 3 is an illustrative diagram explaining the principles of the invention, and Fig. 4 is a diagram of a further modification applicable to polyphase machines.

Referring more particularly to Fig. 1, A is the armature of the main alternator whose electromotive force is to be regulated, while B is its field-magnet winding. The alternator in the form shown feeds current through rings and brushes to the mains $ab$, which mains are supposed to lead to the distribution system. The field-magnet coils B are supplied with current from the main exciter E, driven in any suitable way—as, for example, by the belt G.

The field-magnet windings $B^2$ of the exciter E are fed from the commutator F and controlled by the resistance R, as usual; but interposed in series with the field-magnet circuit is the armature A' of an auxiliary exciter, which is so arranged as to be driven in synchronism with the main alternator. For example, the two machines—the main generator and the auxiliary exciter—may have the same number of poles and may be placed upon the said shafts or upon shafts mechanically connected by the coupling C, or any other arrangement may be used by which the two machines will be maintained in rigid synchronism, speaking from an electrical point of view. The armature-winding A' of the auxiliary exciter is connected in series with the armature A of the main machine and with the mains $ab$, so that the current of the main machine passes through the armature of the auxiliary exciter. The connections are so made that the electromotive force or potential difference created in the armature A' by the passage of the main alternating current therethrough shall be slightly in advance of the electromotive force induced in the armature A' by its relative rotation with the fields B'.

It will be seen that when no current passes through the mains $ab$—that is to say, when there is no load on the main alternator—the electromotive force of the current supplied to the field-windings $B^2 B^2$ of the main exciter will be the sum of the electromotive force due to its armature E and the electromotive force induced by the rotation of the armature A' of the auxiliary exciter within its field-magnets B'. The current due to this electromotive force may be adjusted by means of the resistance R to bring the field excitation of the main exciter to such a value as to generate a current in the circuit $de$, leading to the field-magnet coils B B of the main alternator, sufficient to bring the electromotive force of the armature A of the alternator to the point desired. This is the no-load excitation. If now a non-inductive load is thrown on the main alternator, alternating current will pass from the armature A through the armature A' of the auxiliary exciter, which will have the effect of increasing the electromotive force upon the direct-current side of the auxiliary exciter. This will in turn, if the machines are properly designed, increase the electromotive force of the main exciter E and finally increase the electromotive force of the main alternator sufficient to compensate for the drop in its armature. If the machine is to be overcompounded, the design will be such that the rise in potential will be sufficient to compensate not only for the drop in the armature, but also for the drop in the feeders up to a certain chosen point in the distribution system.

Referring now to Fig. 3, in which the armature A' of the auxiliary exciter is shown furnishing the sole current for the field-magnets B² of the main exciter, $m$ may be supposed to be the polar line of the field-magnets B', which field-magnets are preferably unsupplied with any exciting-winding, but excited simply by the armature reaction. It will then be evident that the line of maximum electromotive force when no current flows in the mains $a\,b$ will be the line $n'$, approximately at right angles with the line $m$. It will be seen that the mains $a\,b$ connect through the rings and brushes with two diametrically opposite points in the armature-winding A'. These two points are upon the line $n^2$, which line represents the angular position of the exciter-armature corresponding to the maximum point on the electromotive-force wave of the main alternator and is slightly in advance in the direction of rotation of the line $n'$ at right angles to the polar line $m$. It appears, therefore, that any increase in the lag of the current in the main circuit will have the effect of allowing the exciter-armature to revolve through a greater angle from its middle position before the alternating current supplied thereto reaches its maximum. The line $l^2$ may be supposed to represent this position, which, as will readily be seen, is such as to bring the magnetization of the armature more into line with the field magnetization, thus acting to strengthen the same. It thus appears that any increase in the lag of the main current will cause a corresponding increase in the excitation of the alternator. On the other hand, any lead of the current in the main circuit will cause the polar line, due to the alternating current, to come to some such point as $l'$, tending to reduce the excitation of the main machine. The machine is thus automatically regulated not only for changes of load, but also for changes of lag or lead in the main circuit.

Though I have shown the main exciter as a small generator, it will be obvious that any dynamic source of electromotive force may be adopted to perform its functions.

In the form shown in Fig. 2 the field-magnets of the main exciter are excited by two separate coils or sets of coils B² B² and B³ B³. The coils B³ are excited in shunt to the armature E and regulated by the resistance R² and furnish what may be termed the "initial excitation." The coils B² are excited directly from the armature A' of the auxiliary exciter through the resistance R and furnish the additional or regulating excitation.

Fig. 4 is a diagram showing the application of my invention to polyphase machines. In this figure the transformer T has its primary coils in series with the mains $a\,b\,c$, supposed to be the mains leading from the three-phase generator to be regulated, while its secondaries, shown here as Y-connected, feed the armature A' of the auxiliary exciter through rings and brushes. The armature A' feeds the field-magnet windings B², as in the form shown in Figs. 2 and 3. The operation of this device will be obvious from what has already been said. It will be noticed that the electrical connection between the main armature A and the auxiliary armature A' may in any case be either direct or inductive.

My invention is particularly important in connection with existing installations, as it enables voltage regulation for phase displacement to be obtained without the necessity of purchasing new and expensive main exciters.

It will be obvious that various changes in form and arrangement may be made without departing from the spirit of my invention.

What I claim as new, and desire to secure by Letters Patent of the United States, is—

1. The combination with a dynamo-electric machine of the alternating-current type, of means for furnishing thereto a normal field excitation, and an auxiliary exciter acting to modify the field excitation of said dynamo-electric machine in accordance with changes in the volume and in the phase relation of the current in the main circuit.

2. In combination, a dynamo, a main exciter for the dynamo, an auxiliary exciter supplying current to the field-magnets of the main exciter, and operative connections between the armature of the dynamo and that of the auxiliary exciter by which an alternating current derived from the main machine passes through the armature of the auxiliary exciter, and acts to change the excitation of the main machine in accordance with changes in volume and in the phase relation of the currents in the main circuit, substantially as described.

3. In combination, a dynamo, a main exciter, an auxiliary exciter controlling the fields of the main exciter, and having field-magnets excited by its own armature reaction and operative connections by which an alternating current derived from the main dynamo is passed through the auxiliary exciter, substantially as described.

4. In combination, an alternating-current dynamo having a main exciter, an auxiliary exciter controlling the fields of the main exciter, the auxiliary exciter having an unwound field-magnet, and a connection by which alternating current derived from the main dynamo is passed through the armature of the auxiliary exciter, the auxiliary exciter and the main dynamo being driven in synchronism, substantially as described.

5. A dynamo-electric machine having a field-winding in series with two sources of direct current one of which is synchronously actuated with respect to said machine and the other independently actuated.

6. A dynamo-electric machine having a field-winding in series with the armatures of two exciters one of which is synchronously actuated with respect to said machine and the other independently actuated, the connections between said exciters being such as to bring their respective electromotive forces into opposition to each other.

7. A dynamo-electric machine, a plurality of operatively-connected exciters therefor, and means for exciting the field of one of said exciters solely by armature reaction due to alternating current flowing in leads connected thereto.

8. A dynamo-electric machine having an exciter the field of which is excited solely by armature reaction due to currents derived from said dynamo-electric machine.

9. A dynamo-electric machine having a synchronously-actuated exciter the field of which is excited solely by armature reaction due to alternating current flowing through leads connected to said exciter.

10. A dynamo-electric machine having its field excited by the coöperative action of a plurality of sources of direct current, one of which is synchronously actuated with respect to said machine, and another independently actuated.

In witness whereof I have hereunto set my hand this 8th day of January, 1898.

CHARLES P. STEINMETZ.

Witnesses:
B. B. HULL,
A. H. ABELL.